United States Patent
Park et al.

(10) Patent No.: US 9,288,691 B2
(45) Date of Patent: Mar. 15, 2016

(54) METHOD FOR REPORTING CHANNEL STATE INFORMATION IN WIRELESS COMMUNICATION SYSTEM AND APPARATUS THEREFOR

(75) Inventors: Jonghyun Park, Anyang-si (KR); Kijun Kim, Anyang-si (KR); Seungmin Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 164 days.

(21) Appl. No.: 13/979,872

(22) PCT Filed: Dec. 12, 2011

(86) PCT No.: PCT/KR2011/009535
§ 371 (c)(1),
(2), (4) Date: Jul. 16, 2013

(87) PCT Pub. No.: WO2012/102479
PCT Pub. Date: Aug. 2, 2012

(65) Prior Publication Data
US 2013/0294393 A1 Nov. 7, 2013

Related U.S. Application Data

(60) Provisional application No. 61/435,761, filed on Jan. 24, 2011.

(51) Int. Cl.
*H04W 4/00* (2009.01)
*H04W 24/02* (2009.01)
*H04B 7/02* (2006.01)
(Continued)

(52) U.S. Cl.
CPC .............. *H04W 24/02* (2013.01); *H04B 7/024* (2013.01); *H04B 7/0626* (2013.01); *H04B 7/0632* (2013.01); *H04B 7/0639* (2013.01); *H04L 1/0026* (2013.01); *H04L 1/06* (2013.01); *H04L 2001/0092* (2013.01)

(58) Field of Classification Search
None
See application file for complete search history.

(56) References Cited

U.S. PATENT DOCUMENTS 8,442,566 B2 * 5/2013 Liu et al. .................. 455/509
8,848,817 B2 * 9/2014 Onggosanusi et al. ....... 375/267
(Continued)

OTHER PUBLICATIONS

Motorola Solutions, "Simulation Considerations on Distributed RRHs and COMP," 3GPP TSG RAN1#63bis, Agenda Item 6.3.1.1, R1-110293, Jan. 17-21, 2011, Dublin, Ireland, 3 pages.
(Continued)

*Primary Examiner* — Phirin Sam
(74) *Attorney, Agent, or Firm* — Birch, Stewart, Kolasch & Birch, LLP

(57) ABSTRACT

The present invention relates to a method for enabling a terminal to report channel state information in a wireless communication system for supporting coordinated multi point (CoMP) transmission. Specifically, the method for enabling the terminal to report the channel state information in the wireless communication system for supporting CoMP transmission includes the steps of: receiving a reference signal from a serving cell and one or more cooperated cells; forming the channel state information for the CoMP transmission on the basis of the reference signal; and reporting the channel state information through a physical uplink shared channel to the serving cell, wherein the channel state information includes channel quality indicator (CQI) information and precoding matrix index (PMI) information, and the CQI information includes a wideband CQI and a CQI for each selected sub-band of the CoMP transmission.

10 Claims, 9 Drawing Sheets

(51) Int. Cl.
*H04B 7/06* (2006.01)
*H04L 1/00* (2006.01)
*H04L 1/06* (2006.01)

(56) References Cited

U.S. PATENT DOCUMENTS

| | | | |
|---|---|---|---|
| 8,908,582 B2 * | 12/2014 | Damnjanovic et al. | 370/311 |
| 2009/0129499 A1 * | 5/2009 | Kwak et al. | 375/267 |
| 2010/0098012 A1 * | 4/2010 | Bala et al. | 370/329 |
| 2010/0273514 A1 | 10/2010 | Koo et al. | |
| 2010/0311430 A1 * | 12/2010 | Katayama et al. | 455/450 |
| 2011/0205981 A1 * | 8/2011 | Koo et al. | 370/329 |
| 2011/0305161 A1 * | 12/2011 | Ekpenyong et al. | 370/252 |
| 2012/0020230 A1 * | 1/2012 | Chen et al. | 370/252 |
| 2012/0127869 A1 * | 5/2012 | Yin et al. | 370/252 |
| 2012/0140708 A1 * | 6/2012 | Choudhury et al. | 370/328 |
| 2012/0250558 A1 * | 10/2012 | Chung et al. | 370/252 |
| 2013/0003788 A1 * | 1/2013 | Marinier et al. | 375/219 |
| 2013/0201912 A1 * | 8/2013 | Sheng et al. | 370/328 |
| 2014/0233498 A1 * | 8/2014 | Chen et al. | 370/329 |

OTHER PUBLICATIONS

Samsung, "A Feedback Framework Based on W2W1 for Rel. 10," 3GPP TSG RAN WG1 Meeting #61bis, Agenda Item 6.3.4, R1-103664, Jun. 29-Jul. 2, 2010, Dresden, Germany, 19 pages.

* cited by examiner

FIG. 2
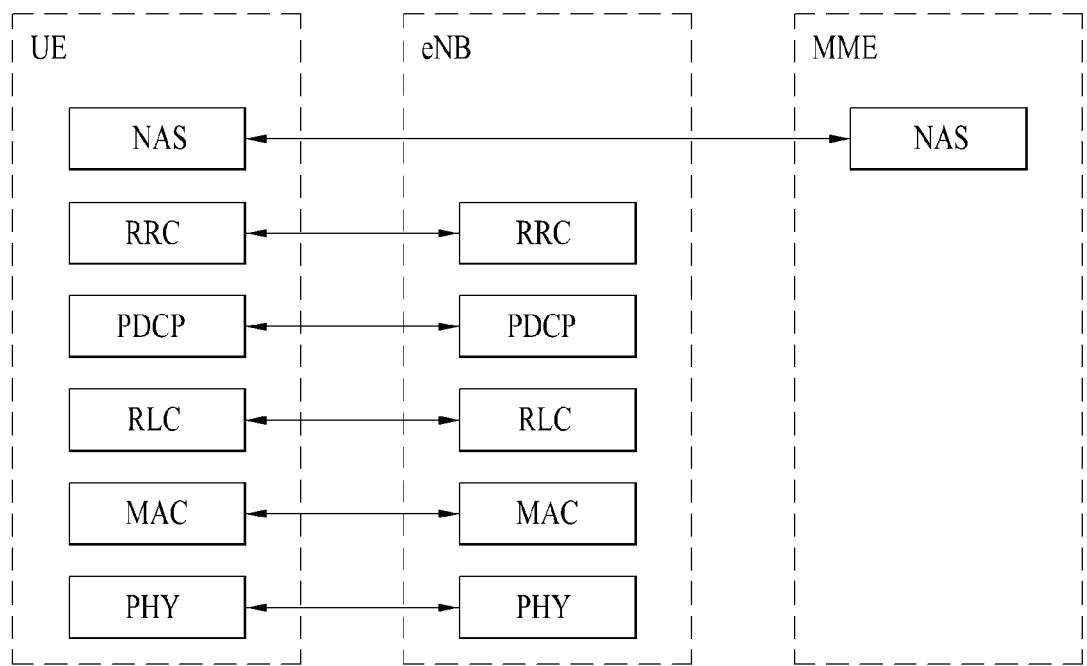
(a) control plane protocol stack
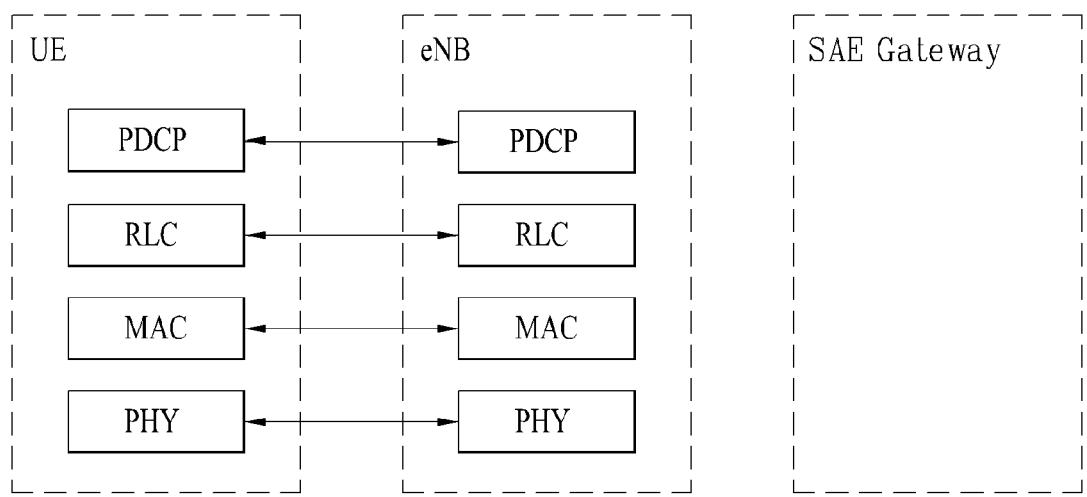
(b) user plane protocol stack

METHOD FOR REPORTING CHANNEL STATE INFORMATION IN WIRELESS COMMUNICATION SYSTEM AND APPARATUS THEREFOR

This application is the National Phase of International Application No. PCT/KR2011/009535 filed on Dec. 12, 2011, which claims priority under 35 U.S.C. 110(e) to the U.S. Provisional Application No. 61/435,761 filed on Jan. 24, 2011, all which are hereby expressly incorporated by reference into the present application.

TECHNICAL FIELD

The present invention relates to a wireless communication system, and more particularly, to a method of reporting a channel state information in a wireless communication system supporting a Coordinated Multi Point (CoMP) transmission and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE (long term evolution) system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of reporting channel state information in a wireless communication system and an apparatus therefor in the following description based on the discussion mentioned in the foregoing description.

Technical Solution

To achieve these and other advantages and in accordance with the purpose of the present invention, as embodied and broadly described, according to one embodiment of the present invention a method of reporting a channel state information, which is reported by a user equipment in a wireless communication system supporting a Coordinated Multi Point (CoMP) transmission includes the steps of receiving a reference signal from a serving cell and at least one cooperative cell, forming the channel state information for the CoMP transmission based on the reference signal, and reporting the channel state information to the serving cell on Physical Uplink Shared Channel, wherein the channel state information includes a Channel Quality Indicator (CQI) information and a Precoding Matrix Index (PMI) information, wherein the CQI information includes a wideband CQI and a CQI for each of subband selected for the CoMP transmission, wherein the PMI information includes a wideband PMI and a PMI for each of the selected subband.

Meanwhile, to further achieve these and other advantages and in accordance with the purpose of the present invention, according to a different embodiment a user equipment device in a wireless communication system supporting a Coordinated Multi Point (CoMP) transmission includes a reception module configured to receive a reference signal from a serving cell and at least one cooperative cell, a processor configured to form the channel state information for the CoMP transmission based on the reference signal, and a transmission module configured to transmit the channel state information to the serving cell on Physical Uplink Shared Channel, wherein the channel state information includes a Channel Quality Indicator (CQI) information and a Precoding Matrix Index (PMI) information, wherein the CQI information includes a wideband CQI and a CQI for each of subband selected for the CoMP transmission, wherein the PMI information includes a wideband PMI and a PMI for each of the selected subband.

In this case, the CQI for each of sub bands selected for the CoMP transmission is expressed by a value of difference with the wideband CQI.

And, the channel state information can include an indicator indicating a position of the selected subband in a system bandwidth and can further include an information to compensate at least one of a relative phase difference or a relative amplitude difference of between a signal transmitted from the at least one cooperative cell and a signal transmitted from the serving cell. Moreover, the channel state information includes a rank indicator (RI).

Preferably, the PMI information is configured for each of the serving cell and the at least one cooperative cell.

Advantageous Effects

According to embodiments of the present invention, it is able to more effectively transmit channel state information in a wireless communication system supporting a Coordinated Multi Point (CoMP) transmission.

Effects obtainable from the present invention may be non-limited by the above mentioned effects. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a diagram for structures of control and user planes of radio interface protocol between a 3GPP radio access network standard-based user equipment and E-UTRAN;

BEST MODE

Mode for Invention

Figure 1:
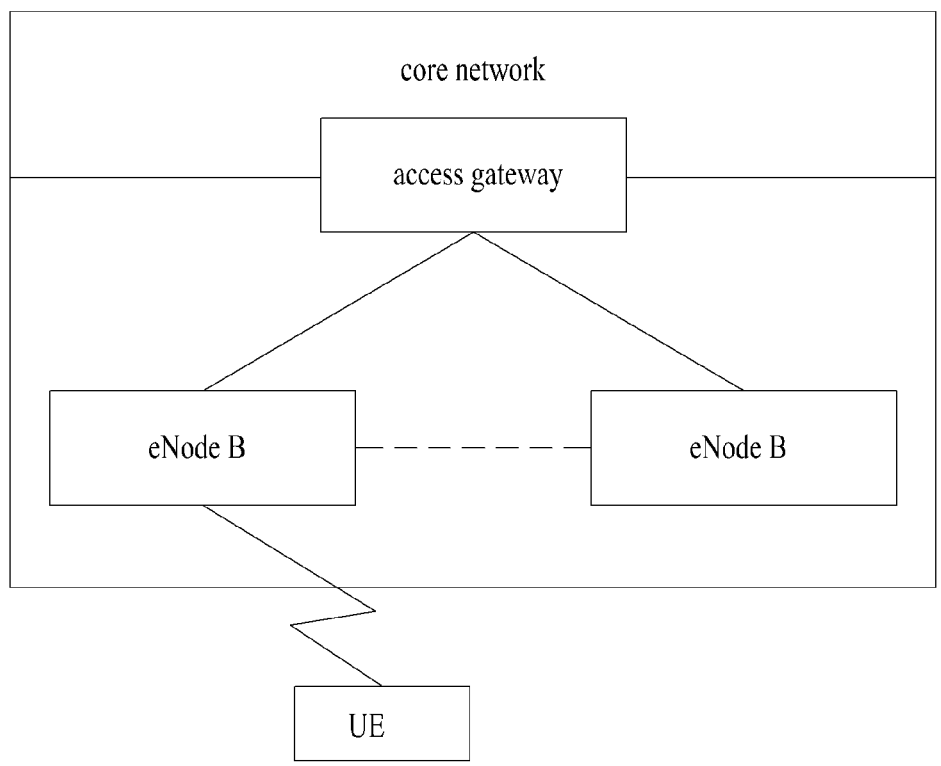
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention can be applied to H-FDD or TDD in a manner of being easily modified.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
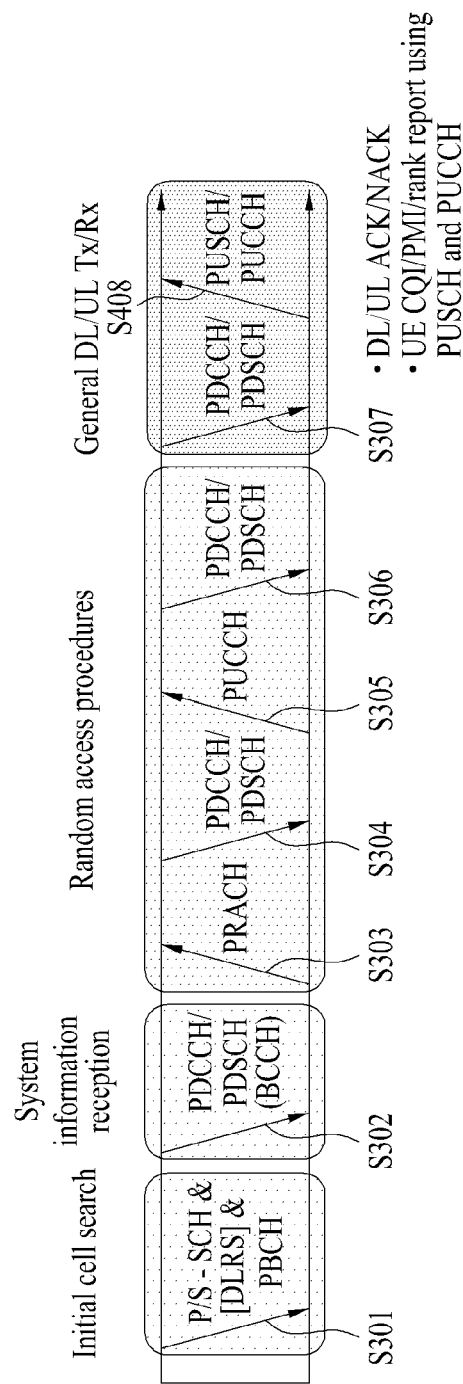
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may be then able to obtain information such as a cell ID and the like. Subsequently, the user equipment receives a physical broadcast channel from the eNode B and may be then able to obtain intra-cell broadcast information. Meanwhile, the user equipment receives a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure (RACH) to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
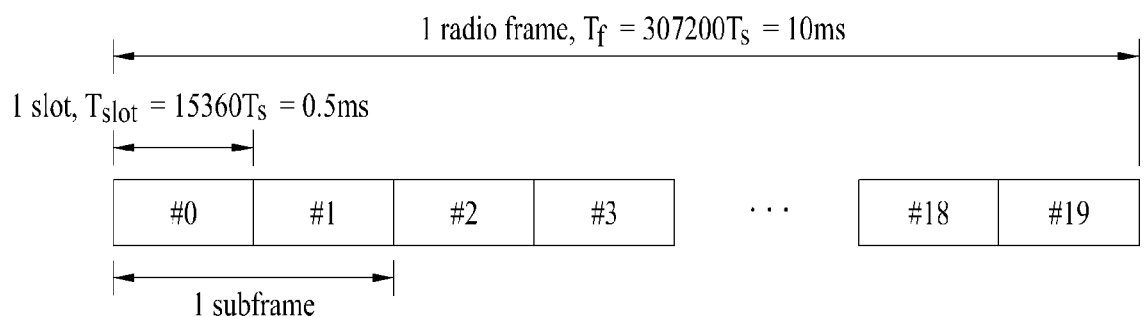
FIG. 4 is a diagram for a structure of a radio frame in LTE system.

FIG. 4 is a diagram for a structure of a radio frame used in an LTE system. Referring to FIG. 4, one radio frame has a length of 10 ms ($327{,}200 \times T_s$) and is constructed with 10 subframes in equal size. Each of the subframes has a length of 1 ms and is constructed with two slots. Each of the slots has a length of 0.5 ms ($15{,}360 \times T_s$). In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
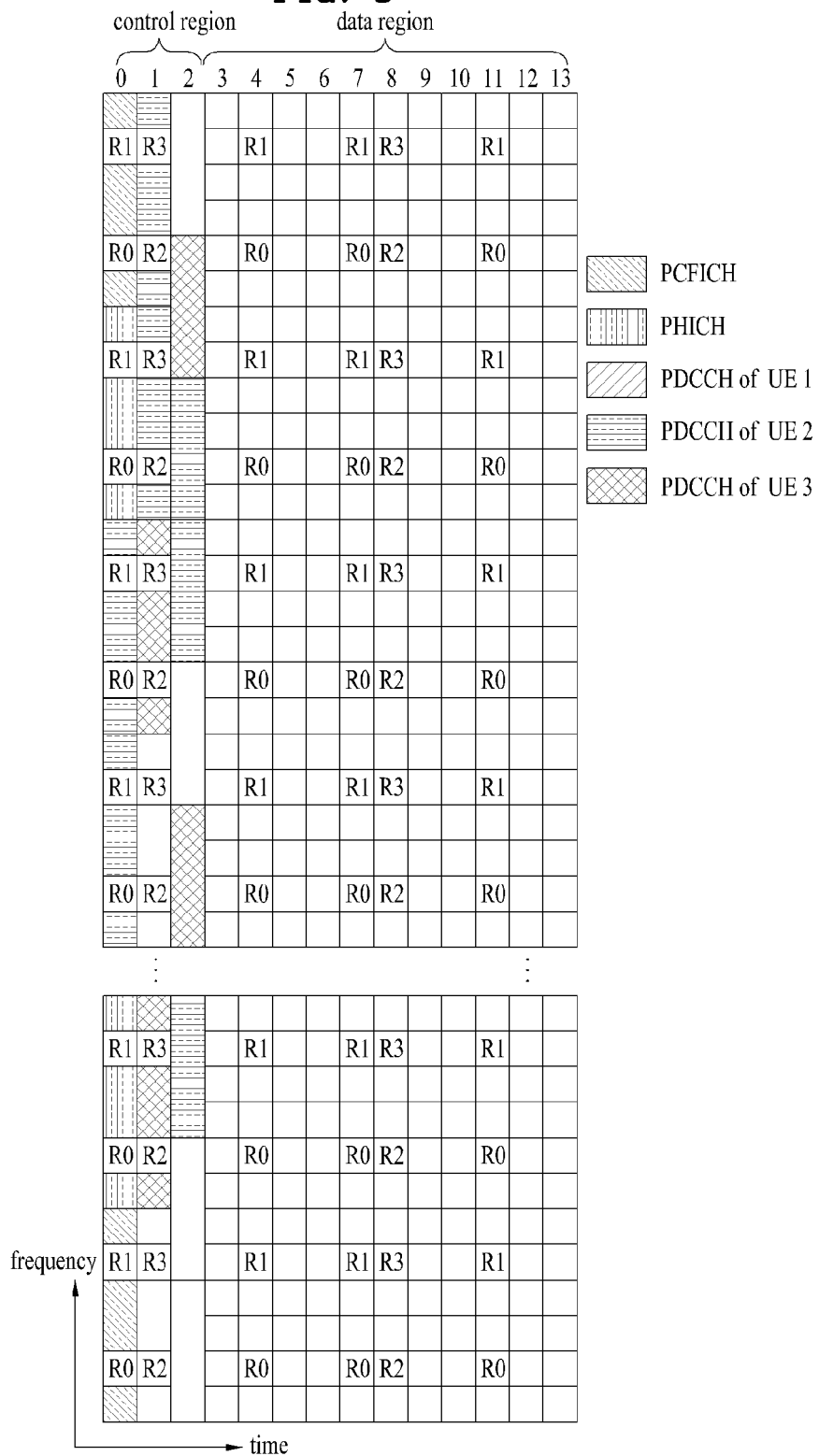
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS or a pilot signal) for an antenna 0 to 3. The RS is fixed as a constant pattern in the subframe irrespective of the control region and the data region. The control channel is allocated to a resource to which the RS is not allocated in the control region and a traffic channel is also allocated to a resource to which the RS is not allocated in the data region. The control channel allocated to the control region may include a physical control format indicator channel (PCFICH), a physical hybrid-ARQ indicator channel (PHICH), a physical downlink control channel (PDCCH) and the like.

The PCFICH is a physical control format indicator channel and informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH is a physical HARQ (hybrid-automatic repeat and request) indicator channel and used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH is a physical DL control channel and is allocated to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on where the data of the PDSCH is transmitted to which user equipment (one or a plurality of user equipments) and the information on how to receive and decode the PDSCH data by the user equipments and the like are transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transmission block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
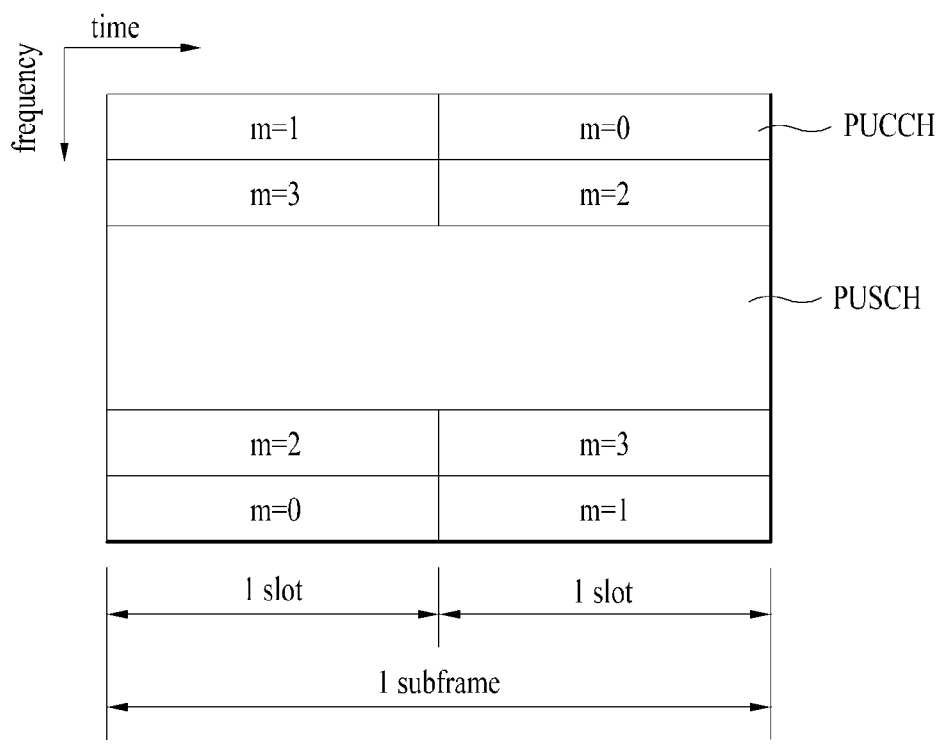
FIG. 6 is a diagram for a structure of an uplink subframe used in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource request, and the like. The PUCCH for a single UE uses one resource block, which occupies different frequencies in each slot within a subframe. In particular, 2 resource blocks assigned to the PUCCH are frequency hopped on a slot boundary. In particular, FIG. 6 shows an example that the PUCCH satisfying conditions (e.g., m=0, 1, 2, 3) is assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi-antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
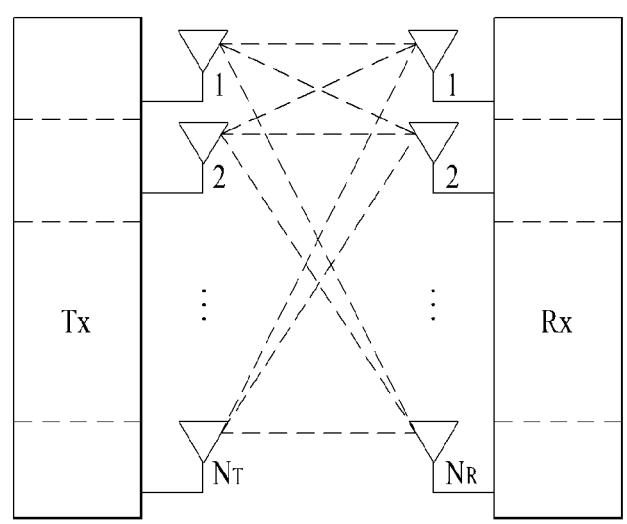
FIG. 7 is a block diagram of a general multi-antenna (MIMO) communication system.

A block diagram of a general multi-antenna communication system is depicted in FIG. 7. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1. In this case, the $R_i$ is a smaller value of the $N_T$ and the $N_R$.

$$R_i = \min(N_T, N_R) \quad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s = [s_1, s_2, \ldots, s_{N_T}]^T \quad \text{[Formula 2]}$$

Meanwhile, for each of the transmission informations $s_1, s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector in the following Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vectors ŝ. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an $i^{th}$ transmitting antenna and $j^{th}$ information. The W is called the weighted matrix or a precoding matrix.

$$x = \quad \text{[Formula 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \quad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams} \leq \text{rank}(H) \leq \min(N_T, N_R) \quad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (CoMP-joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in case of a DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)). On the other hand, according to the coordinated scheduling/beamforming method (CoMP-CS/CB), the user equipment may be able to instantaneously receive data from a single base station via a beamforming.

According to the joint processing (CoMP-JP) method in case of an UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

In the following description, channel state information (CSI) report is explained. In a current LTE standard, there exist two types of transmission scheme, i.e., an open-loop MIMO operated without channel information and a closed-loop MIMO operated based on channel information. In particular, in the closed loop MIMO, each of a user equipment and an eNode B can perform a beamforming based on the channel state information to obtain a multiplexing gain of MIMO antenna. The eNode B commands the user equipment to feedback channel state information on a downlink signal to obtain the channel state information (CSI) from the user equipment in a manner of assigning Physical Uplink Control Channel (PUCCH) or Physical Uplink Shared Channel (PUSCH) to the user equipment.

The CSI is mainly classified into an RI (rank indicator), a PMI (precoding matrix index), and a CQI (channel quality indication). First of all, as mentioned in the foregoing description, the RI indicates rank information of a channel and means the number of stream capable of being received by a user equipment via an identical frequency-time resource. And, since the RI is determined by a long term fading of a channel, the RI is feedback to an eNode B with a longer interval compared to the PMI and CQI value in general.

Secondly, the PMI is a value reflecting a spatial characteristic of a channel and indicates a UE's preferred precoding matrix index of an eNode B on the basis of such a metric as SINR, and the like. Lastly, the CQI is a value indicating strength of a channel and means a reception SINR capable of being received in case that an eNode B uses the PMI in general.

To obtain an additional multi-user diversity using a multi-user MIMO (MU-MIMO) is added to a more advanced communication system such as LTE-A standard. Since interference between user equipments, which are multiplexed in an antenna domain, exists in MU-MIMO, accuracy of the CSI may deeply affect the interference of multiplexed different user equipment as well as the user equipment reporting the CSI. Hence, a more accurate CSI report is required in MU-MIMO compared to SU-MIMO. To this end, LTE-A standard determined the last PMI to be designed in a manner of dividing into a W1 and a W2. The W1 indicates a long term and/or a wideband PMI and the W2 indicates a short term and/or a sub-band PMI.

As an example of a hierarchical codebook transformation scheme configuring one last PMI from the W1 and W2 information, a long-term covariance matrix of a channel can be used as shown in Formula 8 as follows.

$$W = \text{norm}(W1 \, W2) \quad [\text{Formula 8}]$$

In the Formula 8, W2 corresponds to a codeword of a codebook configured to reflect short term channel information as a short term PMI, W corresponds to a codeword of a last codebook, and norm(A) means a matrix that a norm of each row of matrix A is normalized to 1.

Detail structure of a legacy W1 and W2 is represented by Formula 9 as follows.

$$W1(i) = \begin{bmatrix} X_i & 0 \\ 0 & X_i \end{bmatrix}, \quad [\text{Formula 9}]$$

where $X_i$ is Nt/2 by M matrix.

$$W2(j) = \begin{bmatrix} e_M^k & e_M^l & & e_M^m \\ & & \cdots & \\ \alpha_j e_M^k & \beta_j e_M^l & & \gamma_j e_M^m \end{bmatrix} \overset{r \text{ columns}}{}$$

(if rank=r), where $1 \leq k, l, m \leq M$ and k,l,m are integer.

In this case, $N_t$ indicates the number of transmission antenna. And, M corresponds to the number of columns in a matrix $X_i$ and indicates that a total M number of candidate column vectors exist in the matrix $X_i$. $e_M^k$, $e_M^l$, and $e_M^m$ are column vectors where $k^{th}$, $l^{th}$, and $m^{th}$ element is 1 and the rest of elements is 0 among m number of elements and indicate $k^{th}$, $l^{th}$, and $m^{th}$ column vectors in the matrix $X_i$. $\alpha_j$, $\beta_j$, and $\gamma_j$ correspond to complex values having a unit norm, respectively. In case of sorting out $k^{th}$, $l^{th}$, and $m^{th}$ column vectors in the matrix $X_i$, $\beta_j$, $\beta_j$, and $\gamma_j$ indicate that a phase rotation is applied to the $k^{th}$, $l^{th}$, and $m^{th}$ column vectors. 'i' is an integer equal to 0 or greater than 0 and indicates a PMI index indicating the W1. T is an integer equal to 0 or greater than 0 and indicates the PMI index indicating the W2.

In Formula 9, a structure of a codeword uses a cross polarized antenna. In case that a space between antennas is dense, for instance, if a distance between neighboring antennas is less than a half of a signal wavelength in general, the structure is a structure designed in a manner of reflecting a correlation characteristic of a generated channel. In case of the cross polarized antenna, an antenna can be classified into a horizontal antenna group and a vertical antenna group. Each antenna group has a characteristic of a uniform linear array (ULA) and two antenna groups are co-located.

Hence, the correlation between antennas of each group has a characteristic of an identical linear phase increment and the correlation between the antenna groups has a characteristic of a phase rotation. Consequently, since a codebook is a value resulted from a channel quantization, it is necessary to design the codebook by reflecting the characteristic of a channel as it is. For clarity of explanation, a rank 1 codeword designed by the aforementioned structure can be represented as Formula 10 as follows.

$$W1(i) * W2(j) = \begin{bmatrix} X_i(k) \\ \alpha_j X_i(k) \end{bmatrix} \quad [\text{Formula 10}]$$

According to the above Formula 10, a codeword is represented by a vector of the number $N_T \times 1$ of transmission antennas, is structuralized by a upper vector $X_i(k)$ and a lower vector $\alpha_j X_i(k)$, and the upper and lower vector show the correlation characteristic of the horizontal antenna group and the vertical antenna group, respectively. It is better to represent the $X_i(k)$ as a vector having a characteristic of linear phase increment by reflecting the correlation characteristic between antennas of each group. As a representative example, a DFT matrix can be used.

And, for a CoMP transmission, higher level of CSI accuracy is required as well. In case of a CoMP JT, since many eNode Bs cooperatively transmit an identical data to a specific user equipment, it can be theoretically regarded as a MIMO system where antennas are geographically distributed. In particular, similar to a single cell MU-MIMO, in case of performing MU-MIMO in JT, high level of CSI accuracy is required as well to avoid interference between user equipments, which are scheduled together. And, in case of CoMP CB, a precise CSI is required as well to avoid interference affecting a serving cell by a neighboring cell.

A single cell-based PUSCH feedback reporting mode, which is currently discussed by LTE-A standard, is summarized in the following Table 1.

TABLE 1

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

In Table 1, a mode 1-2, a mode 3-1, and a mode 2-2, which report a PMI, are described in detail. In the following description, N is defined for the total number of sub-band according to a system bandwidth.

First of all, the mode 1-2 is a feedback mode reporting multiple PMIs and one wideband CQI. And, PMI is fed back in a subband (SB) unit. Table 2 in the following indicates a bit size for each of CQI and PMI in case that the number of an antenna port is 2 or 4 in the mode 1-2. Table 3 indicates a bit size for each of CQI and PMI in case that the number of an antenna port is 8 in the mode 1-2.

TABLE 2

| | Bit width | | | |
|---|---|---|---|---|
| | 2 antenna ports | | 4 antenna ports | |
| Field | Rank = 1 | Rank = 2 | Rank = 1 | Rank > 1 |
| Wideband CQI codeword 0 | 4 | 4 | 4 | 4 |
| Wideband CQI codeword 1 | 0 | 4 | 0 | 4 |
| Precoding matrix indicator | 2N | N | 4N | 4N |

TABLE 3

| | Bit width | | | |
|---|---|---|---|---|
| Field | Rank = 1 | Rank = 2 | Rank = 3 | Rank = 4 |
| Wideband CQI codeword 0 | 4 | 4 | 4 | 4 |
| Wideband CQI codeword 1 | 0 | 4 | 4 | 4 |
| Wideband first PMI i1 | 4 | 4 | 2 | 2 |
| Subband second PMI i2 | 4N | 4N | 4N | 3N |

| | Bit width | | | |
|---|---|---|---|---|
| Field | Rank = 5 | Rank = 6 | Rank = 7 | Rank = 8 |
| Wideband CQI codeword 0 | 4 | 4 | 4 | 4 |
| Wideband CQI codeword 1 | 4 | 4 | 4 | 4 |
| Wideband first PMI i1 | 2 | 2 | 2 | 0 |
| Subband second PMI i2 | 0 | 0 | 0 | 0 |

Secondly, the mode 3-1 is a feedback mode reporting one wideband PMI and multiple CQIs. And, CQI is fed back in a subband (SB) unit. Table 4 in the following indicates a bit size for each of CQI and PMI in case that the number of an antenna port is 2 or 4 in the mode 3-1. Table 5 indicates a bit size for each of CQI and PMI in case that the number of an antenna port is 8 in the mode 3-1.

TABLE 4

| | Bit width | | | |
|---|---|---|---|---|
| | 2 antenna ports | | 4 antenna ports | |
| Field | Rank = 1 | Rank = 2 | Rank = 1 | Rank > 1 |
| Wide-band CQI codeword 0 | 4 | 4 | 4 | 4 |
| Subband differential CQI codeword 0 | 2N | 2N | 2N | 2N |
| Wide-band CQI codeword 1 | 0 | 4 | 0 | 4 |
| Subband differential CQI codeword 1 | 0 | 2N | 0 | 2N |
| Precoding matrix indicator | 2 | 1 | 4 | 4 |

TABLE 5

| | Bitwidth | | | |
|---|---|---|---|---|
| Field | Rank = 1 | Rank = 2 | Rank = 3 | Rank = 4 |
| Wideband CQI codeword 0 | 4 | 4 | 4 | 4 |
| Subband differential CQI codeword 0 | 2N | 2N | 2N | 2N |
| Wideband CQI codeword 1 | 0 | 4 | 4 | 4 |
| Subband differential CQI codeword 1 | 0 | 2N | 2N | 2N |
| Wideband first PMI i1 | 4 | 4 | 2 | 2 |
| Subband second PMI i2 | 4 | 4 | 4 | 3 |

| | Bitwidth | | | |
|---|---|---|---|---|
| Field | Rank = 5 | Rank = 6 | Rank = 7 | Rank = 8 |
| Wideband CQI codeword 0 | 4 | 4 | 4 | 4 |
| Subband differential CQI codeword 0 | 2N | 2N | 2N | 2N |
| Wideband CQI codeword 1 | 4 | 4 | 4 | 4 |
| Subband differential CQI codeword 1 | 2N | 2N | 2N | 2N |
| Wideband first PMI i1 | 2 | 2 | 2 | 0 |
| Subband second PMI i2 | 0 | 0 | 0 | 0 |

Lastly, the mode 2-2 is a feedback mode reporting multiple PMIs and multiple CQIs. Each of PMI and CQI is fed back for a wideband and M number of selected sub bands (M-selected SB). In this case, an average PMI and a corresponding CQI are transmitted for the M-selected SBs and an indicator of L-bit size indicating the selected M number of SB index is transmitted together. Table 6 in the following indicates a bit size for each of CQI and PMI in case that the number of an antenna port is 2 or 4 in the mode 2-2. Table 7 indicates a bit size for each of CQI and PMI in case that the number of an antenna port is 8 in the mode 2-2. In particular, the bit size of PMI shown in each of Table 6 and Table 7 is twice as many as the bit size of PMI shown in each of Table 4 and Table 5. This is because 2 PMIs such as an average PMI for a wideband and the average PMI for the M number of selected sub bands are included.

TABLE 6

| | Bit width | | | |
|---|---|---|---|---|
| | 2 antenna ports | | 4 antenna ports | |
| Field | Rank = 1 | Rank = 2 | Rank = 1 | Rank > 1 |
| Wide-band CQI codeword 0 | 4 | 4 | 4 | 4 |
| Subband differential CQI codeword 0 | 2 | 2 | 2 | 2 |
| Wide-band CQI codeword 1 | 0 | 4 | 0 | 4 |
| Subband differential CQI codeword 1 | 0 | 2 | 0 | 2 |
| Position of the M selected subbands | L | L | L | L |
| Precoding matrix indicator | 4 | 2 | 8 | 8 |

TABLE 7

| Field | Bit width | | | | | | | |
|---|---|---|---|---|---|---|---|---|
| | Rank = 1 | Rank = 2 | Rank = 3 | Rank = 4 | Rank = 5 | Rank = 6 | Rank = 7 | Rank = 8 |
| Wide-band CQI codeword 0 | 4 | 4 | 4 | 4 | 4 | 4 | 4 | 4 |
| Subband differential CQI codeword 0 | 2 | 2 | 2 | 2 | 2 | 2 | 2 | 2 |
| Wide-band CQI codeword 1 | 0 | 4 | 4 | 4 | 4 | 4 | 4 | 4 |
| Subband differential CQI codeword 1 | 0 | 2 | 2 | 2 | 2 | 2 | 2 | 2 |
| Position of the M selected subbands | L | L | L | L | L | L | L | L |
| Wideband first PMI i1 | 4 | 4 | 2 | 2 | 2 | 2 | 2 | 0 |
| Wideband second PMI i2 | 4 | 4 | 4 | 3 | 0 | 0 | 0 | 0 |
| Subband second PMI i2 | 4 | 4 | 4 | 3 | 0 | 0 | 0 | 0 |

Each of a wideband first PMI and a subband second PMI, which are mentioned earlier in Table 3, 5, and 7, corresponds to the aforementioned W1 and W2, respectively. And, a bit size for an RI, which is commonly applied to the mode 1-2, the mode 3-1, and the mode 2-2, is described in Table 8 as follows.

TABLE 8

| Field | Bit width | | | | | |
|---|---|---|---|---|---|---|
| | 2 antenna ports | 4 antenna ports | | 8 antenna ports | | |
| | | Max 2 layers | Max 4 layers | Max 2 layers | Max 4 layers | Max 8 layers |
| Rank indication | 1 | 1 | 2 | 1 | 2 | 3 |

The present invention proposes a CoMP CSI reporting mode, which feedbacks channel state information (CSI) of each cooperative cell on PUSCH for a CoMP operation by a user equipment. A PUSCH-based CSI feedback mode proposed by the present invention can be applied to a non-CoMP operation and Dynamic Point Selection (DPS) as well as the CoMP operation depending on a situation. In particular, the PUSCH-based CSI feedback mode can be applied to a case that a CSI reporting is performed in a subband unit as well as the case that the channel information of each of the cooperative cells is reported by a wideband CSI.

Figure 8:
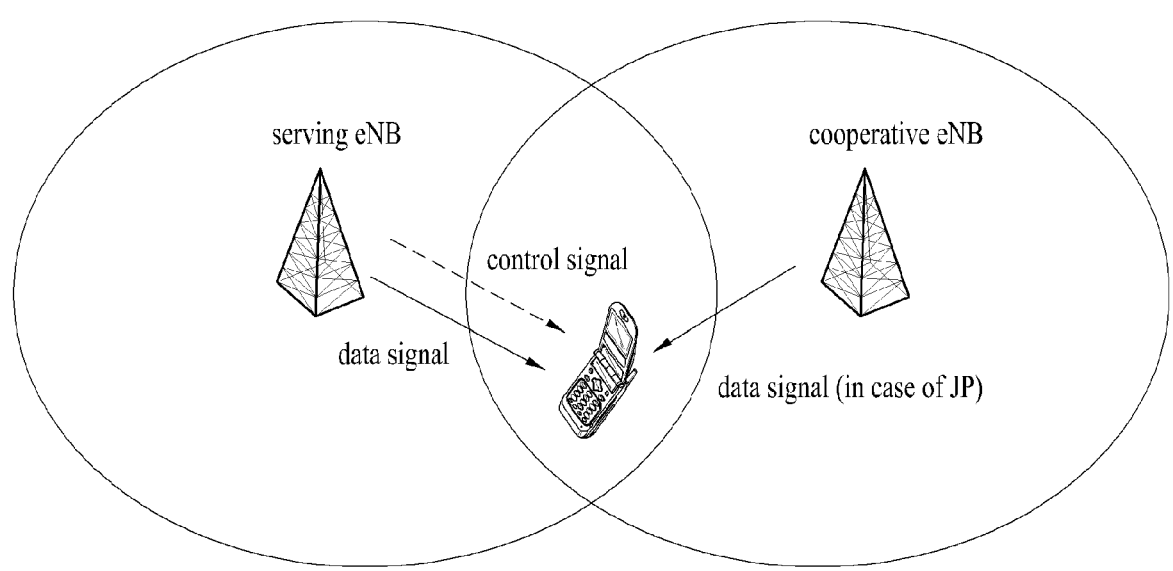
FIG. 8 is a diagram of a CoMP transmission system to which the present invention is applied.

FIG. 8 is a diagram of a CoMP transmission system to which the present invention is applied. In particular, in FIG. 8, a user equipment, i.e., a CoMP UE operates in a manner of receiving control information from a serving eNB (S-eNB) and data information is simultaneously transmitted from the S-eNB and a cooperative eNB (C-eNB) since CoMP JP scheme is applied. If CoMP CS/CB scheme is applied, the data information is transmitted by the S-eNB only. In case of DPS, the data information is transmitted by an eNB dynamically selected in a cooperative cell set consisting of the S-eNB and at least one C-eNB.

Although one C-eNB is depicted in FIG. 8, the present invention is a scheme generally working in a cooperative cell set where multiple C-eNBs exist. And, the present invention can be applied to an intra-site CoMP structure where the eNBs existing in the cooperative cell set is geographically co-located as well as an inter-site CoMP structure where the S-eNB and the C-eNB exist in a manner of geographically being apart from each other as shown in FIG. 8. Or, the present invention can be applied to a heterogeneous network structure including a hybrid structure between the inter-site CoMP structure and the intra-site CoMP structure.

Since a CSI feedback for a cooperative cell is added to the CSI feedback for a CoMP operation compared to a single cell-based non-CoMP CSI reporting, it may be required a large amount of feedback bit size. Hence, if a feedback is performed on PUSCH, a large amount of feedback bit can be transmitted at a time compared to a periodical CSI reporting on PUCCH.

The present invention assumes a situation that a CoMP UE reports a CoMP CSI in a manner of utilizing PUSCH. In this case, a feedback on PUSCH can be aperiodically triggered by the S-eNB using L1/L2 signaling and a periodical PUSCH feedback can be configured via an upper layer signaling.

Since the mode 1-2 corresponding to the aforementioned Table 2 and 3 and the mode 3-1 corresponding to the Table 4 and 5, which are capable of being applied for PUSCH-based CSI reporting, transmit all PMI (corresponding to mode 1-2) or CQI (corresponding to mode 3-1) according to each SB for N number of SBs, a required feedback bit size is relatively big compared to the mode 2-2 for transmitting an average CSI of M number of selected SB (M-selected SB).

Hence, if CSI feedback information of the C-eNB is added to the feedback information of the mode 1-2 and the mode 3-1 according to each mode, a required feedback bit size can be greatly increased according to the total number (N) of sub bands according to the number of the C-eNBs and a system bandwidth. For instance, in case that the system bandwidth corresponds to 110 RBs, 'N=14', and the number of C-eNBs corresponds to C, such bit sizes of CoMP CSI as following Formula 11 to Formula 13 are calculated according to the examples of Table 3 and Table 5. In this case, 'N=14' is a maximum value among the N values according to a system bandwidth, which is currently defined by LTE-A standard.

And, as shown in Formula 11 to Formula 13, in case of the CoMP JT, an inter-cell CSI bit, which is capable of properly compensating a channel difference between a channel of the S-eNB and a channel of the C-eNB and indicating a relative phase and/or relative amplitude of the C-eNB, can be added. In the following description, a size of the inter-cell CSI bit is represented with $\alpha$.

First of all, Formula 11 in the following exemplifies a bit size in case that a CoMP CSI is configured based on Table 3 (mode 1-2) and Table 8 in a condition of N=14, C=3, $\alpha$=3, and RI=2.

$$RI + WB\ CQI \times 2 + (W1 + W2) \times (C+1) + \\ (WB\ CoMP\ CQI) \times 2 + \alpha NC = \qquad \text{[Formula 11]}$$

-continued
$$3 + 4 \times 2 + (4 + 4N) \times (C + 1) + 4 \times 2 + 3NC =$$
$$3 + 8 + 40 \times 4 + 8 + 126 = 385 \text{ bits}$$

Secondly, Formula 12 in the following exemplifies a bit size in case that a CoMP CSI is configured based on Table 5 (mode 3-2) and Table 8 in a condition of N=14, C=3, α=3, and RI=2.

$$RI + (WB\ CQI + SB\ CQI) \times 2 + (W1 + W2) \times (C + 1) + \quad \text{[Formula 12]}$$
$$(WB\ CoMP\ CQI + SB\ CoMP\ CQI) \times 2 + \alpha C =$$
$$3 + (4 + 2N) \times 2 + (4 + 4) \times (C + 1) + (4 + 2N) \times 2 + 3C =$$
$$3 + 64 + 32 + 64 + 9 = 172 \text{ bits}$$

Lastly, Formula 13 in the following exemplifies a bit size in case that a CoMP CSI is configured based on Table 7 (mode 2-2) and Table 8 in a condition of N=14, C=3, α=3, RI=2, and L=19. In this case, 'L' means a bit size to indicate a selected SB.

$$RI + (WB\ CQI + SB\ CQI) \times 2 + (W1 + W2) \times 2 \times (C + 1) + \quad \text{[Formula 13]}$$
$$(WB\ CoMP\ CQI + SB\ CoMP\ CQI) \times 2 + \alpha C + L =$$
$$3 + (4 + 2) \times 2 + (4 + 4) \times 2 \times (C + 1) + (4 + 2) \times 2 +$$
$$3C + 19 = 3 + 12 + 64 + 12 + 9 + 19 = 119 \text{ bits}$$

The bit size calculation mentioned earlier in Formula 11 to Formula 13 varies according to a feedback content configuration for the C-eNBs in case of generating a CoMP CSI. In particular, the bit size calculation can be greatly modified according to such a parameter value as N, C, α, and the like and according to whether WB channel information is fed back only or channel informations are fed back in SB unit as well for CoMP according to C-eNB.

Yet, a characteristic capable of being identified by the aforementioned example is a possibility of occurrence of a case that the CoMP CSI amounting to several hundred bits should be fed back on PUSCH at a time, as a value of such parameters as N, C, α, and the like is bigger and/or as the information intended to be fed back greatly increases like as 8 antenna ports are operated.

In the aforementioned example, a main reason for an extraordinarily big bit size of the mode 1-2, i.e., 385 bits, compared to other cases is to apply N times of a PMI payload size, which is necessary for one SB, as a PMI is reported in SB unit. In particular, if a bit as an inter-cell CSI bit for the CoMP JT is added, it may cause an increase of a payload size where a part applied N times is big in case that a different information is intended to be provided according to an SB.

As a method of reducing the aforementioned feedback overhead, it may be able to consider that the PMI for the C-eNB feedbacks a wideband PMI only. In particular, in case of the CoMP CB, it is possible to determine PMIs according to a SB of the S-eNB based on WB PMI information of the C-eNB to make CB performance to be maximized. And, in case of the CoMP JT, it is possible to additionally determine inter-cell CSI bits according to a SB based on WB PMI information of the C-eNB to make a throughput of the CoMP JT to be maximized when the PMIs according to a SB of the S-eNB are selected.

Yet, if both the S-eNB and the C-eNB have strong frequency selectivity of a channel, it may be able to obtain a bigger CoMP gain by performing a CSI feedback in an SB unit for the S-eNB and the C-eNB.

To this end, the present invention proposes that the aforementioned mode 2-2 is expanded and modified like Table 9 and Table 10 in the following to perform a CoMP CSI feedback in consideration of a CSI feedback overhead.

More specifically, while performing a CSI reporting in a SB unit only for the M number of selected sub bands (M-selected SB) indicated by an indicator of L-bit size, content of the CSI reporting may correspond to not an average CSI for the M number of selected sub bands but a SB PMI and a SB CoMP CQI for each of the M number of selected sub bands. In this case, an inter-cell CSI bit of α-bit size can be fed back together for each of the M number of selected SBs as additional information for a CoMP.

Specifically, Table 9 in the following is an example of expansion of Table 6 and Table 10 in the following is an example of Table 7.

TABLE 9

| | Bit width | | | |
|---|---|---|---|---|
| | 2 antenna ports | | 4 antenna ports | |
| Field | Rank = 1 | Rank = 2 | Rank = 1 | Rank > 1 |
| Wide-band non-CoMP CQI codeword 0 | 4 | 4 | 4 | 4 |
| Subband differential CoMP CQI codeword 0 | 2M | 2M | 2M | 2M |
| Wide-band non-CoMP CQI codeword 1 | 0 | 4 | 0 | 4 |
| Subband differential CoMP CQI codeword 1 | 0 | 2M | 0 | 2M |
| Position of the M selected subbands | L | L | L | L |
| Precoding matrix indicator (s-eNB) | 2 + 2M | 1 + M | 4 + 4M | 4 + 4M |
| Precoding matrix indicator (C c-eNB(s)) | C(2 + 2M) | C(1 + M) | C(4 + 4M) | C(4 + 4M) |
| Inter-cell CSI (Optional) | CM☐ | CM☐ | CM☐ | CM☐ |

TABLE 10

| | Bit width | | | | | | | |
|---|---|---|---|---|---|---|---|---|
| Field | Rank = 1 | Rank = 2 | Rank = 3 | Rank = 4 | Rank = 5 | Rank = 6 | Rank = 7 | Rank = 8 |
| Wide-band non-CoMP CQI codeword 0 | 4 | 4 | 4 | 4 | 4 | 4 | 4 | 4 |
| Subband differential CoMP CQI codeword 0 | 2M | 2M | 2M | 2M | 2M | 2M | 2M | 2M |
| Wide-band non-CoMP CQI codeword 1 | 0 | 4 | 4 | 4 | 4 | 4 | 4 | 4 |

TABLE 10-continued

| Field | Bit width | | | | | | | |
|---|---|---|---|---|---|---|---|---|
| | Rank = 1 | Rank = 2 | Rank = 3 | Rank = 4 | Rank = 5 | Rank = 6 | Rank = 7 | Rank = 8 |
| Subband differential CoMP CQI codeword 1 | 0 | 2M | 2M | 2M | 2M | 2M | 2M | 2M |
| Position of the M selected subbands | L | L | L | L | L | L | L | L |
| WB first PMI i1 (s-eNB) | 8 | 8 | 4 | 4 | 4 | 4 | 4 | 0 |
| SB second PMI i2 (s-eNB) | 4 + 4M | 4 + 4M | 4 + 4M | 3 + 3M | 0 | 0 | 0 | 0 |
| WB first PMI i1 (C c-eNB(s)) | 8C | 8C | 4C | 4C | 4C | 4C | 4C | 0 |
| SB second PMI i2 (C c-eNB(s)) | C(4 + 4M) | C(4 + 4M) | C(4 + 4M) | C(3 + 3M) | 0 | 0 | 0 | 0 |
| Inter-cell CSI (Optional) | CM☐ | CM☐ | CM☐ | CM☐ | CM☐ | CM☐ | CM☐ | CM☐ |

Referring to Table 9 and Table 10, it is able to aware that PMI and CQI are fed back for WB and the M number of selected SB (M-selected SB) in mode 2-2 for a CoMP CSI. In this case, a SB PMI and a corresponding SB CoMP CQI are transmitted to each of the M number of selected SB and an L bits indicator indicating M number of selected SB index is transmitted together.

Formula 14 in the following exemplifies a bit size in case that a CoMP CSI is configured based on Table 10 and Table 8 of the present invention in a condition of N=14, C=3, α=3, RI=2, L=19, and M=5. In this case, 'L' means a bit size to indicate a selected SB.

$$RI + (WB\ CQI + SB\ CQI) \times 2 + L + \\ (W1 + W2) + (CoMPW1 + CoMPW2) + \alpha MC = \\ 3 + (4 + 2M) \times 2 + 19 + (8 + 4 + 4M) + C(8 + 4 + 4M) + \\ 3 \times 3 \times M = 3 + 28 + 32 + 96 + 45 = 204\ \text{bits}$$ [Formula 14]

Figure 9:
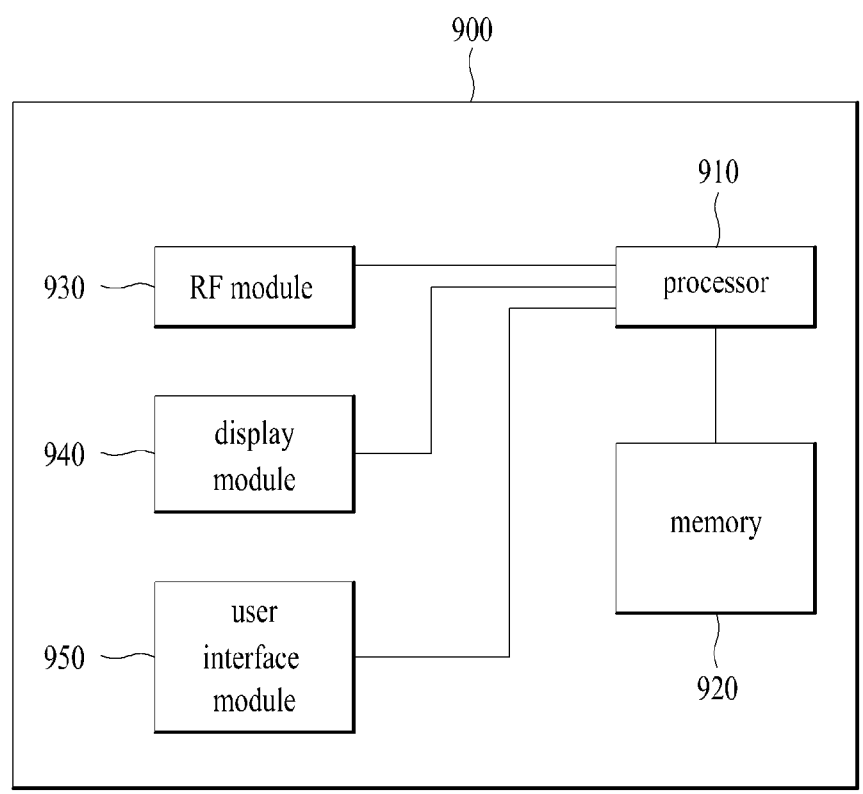
FIG. 9 is a block diagram of an example for a communication device according to one embodiment of the present invention.

FIG. 9 is a block diagram of an example for a communication device according to one embodiment of the present invention.

Referring to FIG. 9, a communication device 900 may include a processor 910, a memory 920, an RF module 930, a display module 940, and a user interface module 950.

Since the communication device 900 is depicted for clarity of description, prescribed module(s) may be omitted in part. The communication device 900 may further include necessary module(s). And, a prescribed module of the communication device 900 may be divided into subdivided modules. A processor 910 is configured to perform an operation according to the embodiments of the present invention illustrated with reference to drawings. In particular, the detailed operation of the processor 910 may refer to the former contents described with reference to FIG. 1 to FIG. 8.

The memory 920 is connected with the processor 910 and stores an operating system, applications, program codes, data, and the like. The RF module 930 is connected with the processor 910 and then performs a function of converting a baseband signal to a radio signal or a function of converting a radio signal to a baseband signal. To this end, the RF module 930 performs an analog conversion, amplification, a filtering, and a frequency up conversion, or performs processes inverse to the former processes. The display module 940 is connected with the processor 910 and displays various kinds of informations. And, the display module 940 can be implemented using such a well-known component as an LCD (liquid crystal display), an LED (light emitting diode), an OLED (organic light emitting diode) display and the like, by which the present invention may be non-limited. The user interface module 950 is connected with the processor 910 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a UE can be performed by an eNode B or other networks except the eNode B. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of reporting a channel state information in a wireless communication system and apparatus therefor are described with reference to examples applied to 3GPP LTE system, it may be applicable to various kinds of wireless communication systems as well as to the 3GPP LTE system.

What is claimed is:

1. A method of reporting channel state information (CSI) by a user equipment in a wireless communication system supporting a Coordinated Multi Point (CoMP) transmission, the method comprising:
   receiving a reference signal (RS) from a serving cell and at least one cooperative cell;
   forming the generating the CSI for the CoMP transmission based on the RS; and
   reporting the CSI to the serving cell on a Physical Uplink Shared Channel (PUSCH),
   wherein the CSI includes a Channel Quality Indicator (CQI) information and a Precoding Matrix Index (PMI) information,
   wherein the CQI information includes a wideband CQI and a CQI for each of subband selected for the CoMP transmission,
   wherein the PMI information includes a wideband PMI and a PMI for each of the selected subband, and
   wherein the CSI includes information to compensate a relative phase difference and a relative amplitude difference between a downlink signal transmitted from the at least one cooperative cell and a downlink signal transmitted from the serving cell.

2. The method of claim 1, wherein the CQI for each of sub bands selected for the CoMP transmission is expressed by a value of difference with the wideband CQI.

3. The method of claim 1, wherein the CSI includes an indicator indicating an index of the selected subband.

4. The method of claim 1, wherein the CSI includes a rank indicator (RI).

5. The method of claim 1, wherein the PMI information is configured for each of the serving cell and the at least one cooperative cell.

6. A user equipment in a wireless communication system supporting a Coordinated Multi Point (CoMP) transmission, the user equipment comprising:
   a reception module configured to receive a reference signal (RS) from a serving cell and at least one cooperative cell;
   a processor configured to generate channel state information (CSI) for the CoMP transmission based on the RS; and
   a transmission module configured to transmit the CSI to the serving cell on a Physical Uplink Shared Channel (PUSCH),
   wherein the CSI includes a Channel Quality Indicator (CQI) information and a Precoding Matrix Index (PMI) information,
   wherein the CQI information includes a wideband CQI and a CQI for each of subband selected for the CoMP transmission,
   wherein the PMI information includes a wideband PMI and a PMI for each of the selected subband, and
   wherein the CSI includes information to compensate a relative phase difference and a relative amplitude difference between a downlink signal transmitted from the at least one cooperative cell and a downlink signal transmitted from the serving cell.

7. The user equipment of claim 6, wherein the CQI for each of sub bands selected for the CoMP transmission is expressed by a value of difference with the wideband CQI.

8. The user equipment of claim 6, wherein the CSI includes an indicator indicating an index of the selected subband.

9. The user equipment of claim 6, wherein the CSI includes a rank indicator (RI).

10. The user equipment of claim 6, wherein the PMI information is configured for each of the serving cell and the at least one cooperative cell.

* * * * *